Patented May 1, 1945

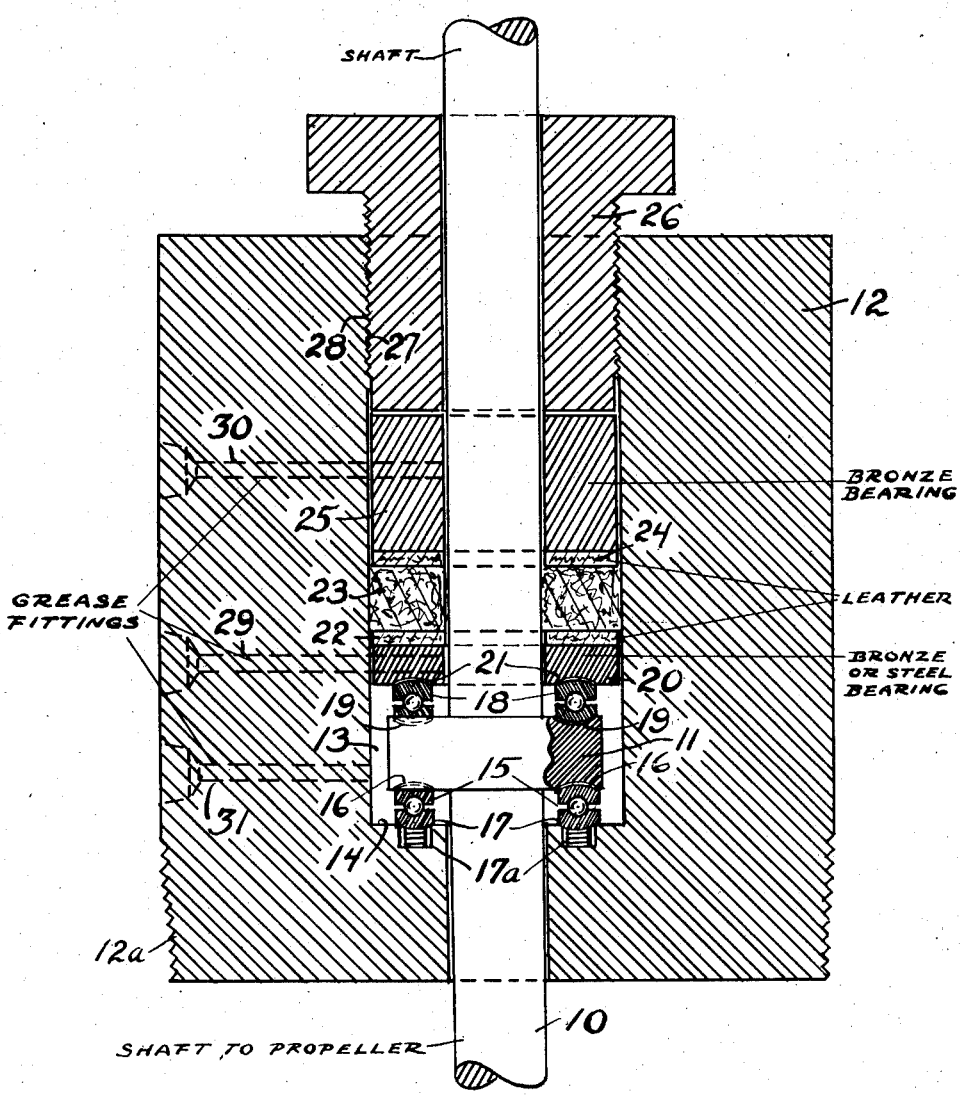

2,374,960

UNITED STATES PATENT OFFICE 2,374,960

PACKING GLAND FOR STIRRER SHAFTS

Francis R. Russell, Westfield, N. J., assignor to Standard Oil Development Company, a corporation of Delaware Application July 16, 1942, Serial No. 451,103

3 Claims. (Cl. 308—36.1)

This invention relates to a seal for rotatable shafts of mechanisms operating within closed vessels.

An object of the invention is the provision of a packing gland of simple construction which is durable and effective under both high and reduced pressure conditions.

Another object of the invention is to secure a joint tight against fluid pressure between the walls of a closed vessel and the rotating shaft, which operates a part or mechanism within the vessel.

A further object is to furnish an improved shaft packing gland of a sealing type which may be connected to stirring or agitating devices within large scale equipment, and furnish thereby a seal against leakage of fluid pressure.

A particular object of the invention is to provide a rotating shaft packing gland ensuring ease of operation of the shaft without undue friction and effective as a seal so that either an expansible fluid can be kept under compression satisfactorily or reduced pressure can be maintained satisfactorily in systems to which it is applied.

Other objects and advantages of the invention will be apparent from the following detailed description.

The figure is a fragmentary view, partly in longitudinal section, of a structure embodying the features of the invention, only such parts being illustrated as are deemed necessary to illustrate the invention.

In the drawing, numeral 10 indicates a shaft of any character, adapted to be rotated by suitable means, as for example, by connection to a motor through a flexible coupling. The shaft, for purposes of this illustration, is presumed connected to a stirrer mechanism within a closed vessel which is not shown in the diagram, as the invention relates wholly to the packing gland of the joint at which the rotation of the shaft takes place. The shaft is provided or formed with a collar 11. The shaft is confined within, but not necessarily in bearing contact with, an entrance or wall 12 of a closed chamber, not shown. The portion 12 of the closed vessel has a recess portion of greater circular cross-sectional area 13 than that of the collar portion 11 rigidly attached to the shaft, into which the shaft and collar portion is adjusted, so that the collar portion 11 rests either directly or indirectly upon the shoulder 14. Instead of numeral 12 representing the entrance portion of a closed vessel, it may be a separate unit connected into the threaded entrance of a closed vessel and fitted for engagement onto the opening of a closed vessel by means of threads 12a. Usually between the collar 11 and the shoulder 14 are arranged ball thrust bearings 15, suitably adjusted in container rings or grooves 16 and 17 upon the collar and shoulders respectively. When springs are employed to produce the initial seal as discussed later, such springs can be inserted as shown by 17a in a recess under the bearing container. On the upper surface of the collar are usually similarly disposed ball thrust bearings 18 located in grooves 19 in the collar. Above the bearings 18 is usually disposed an annular metal cylinder 20, fitting closely into the recess 13 and through which also passes the shaft 10, thus providing for the shaft an alignment bearing. On the lower side of this cylinder is arranged a groove 21 into which the bearing 18 fits.

Above the cylinder 20 is preferably located a washer 22 of resilient material, such as leather, fibre or a plastic. Above such a washer or resting directly upon the cylinder 20 is located a soft, resilient, wear-resisting material 23, such as rubber, neoprene, Butyl rubber or Buna rubber to serve as a packing material for the shaft. Above this packing material is preferably a second washer 24 of resilient material, such as 22. Above such a pliant washer 24 is arranged a second metal annular cylinder 25, similar to 20, which fits closely into the recess 13 and provides a second alignment bearing for the shaft 10. The packing unit within the equipment 12 is completed by a metallic closure member 26, which preferably fits into the upper portion of the recess 13 by thread and screw connections 27 and 28 respectively, thus maintaining the various parts in position. The shaft may be lubricated through lubricant inlets 29 and 30 passing through the shaft container 12 and the corresponding drilled portions of the bearings 20 and 25. The bearings 18 and 15 may be lubricated through lubricant inlet 31.

The packing gland as illustrated in Figure 1 consists of a washer 23 made of soft, resilient, wear-resisting material sandwiched between two leather washers, which themselves are held between two metal cylinders, one, but preferably both, of which are of suitable dimensions to serve as alignment bearings for the shaft. The ball bearings 15 shown under the shoulder merely serve to take any thrust caused by the tightening of the sealing unit 26, which may form the initial seal of the packing gland. Provided the soft packing fits the chamber 13 snugly, no pressure by the sealing member 26 is necessary to make the initial sealing. However, as soon as pressure is applied in the vessel around the lower portion of the shaft, the packing will seal itself due to the thrust upwards on the shaft and little or no load will remain on the lower bearing, so that this bearing is not critical or important. The packing material 23 is made self-sealing and pressure-tight when the pressure is applied around the lower portion of the shaft. This seal is made because the force developed by the pressure acting on the face of the shaft and packing is supported by a relatively soft packing, less in cross-sectional area than the area of the shaft and the annular packing space, so that the pressure developed in the packing is greater than that tending to leak past. The greater the pressure; the tighter the seal. The principle upon which this seal is made is that of the Bridgman principle of unsupported area.

In the packing gland as illustrated, the weight of the shaft assembly, that is, the shaft and stirring mechanism, may add to or subtract from the force developed by the pressure on the "unsupported area" (shaft cross-section). The load will depend upon the position in which the shaft is mounted. If in the bottom of the vessel and mounted vertically, the weight of the shaft and attachments will bear on the packing and contribute to the development of the initial seal.

If mounted horizontally, the weight of the shaft would be immaterial. In this case, the shaft size as compared to the area of the packing gland in cross-section would have to be adjusted to give the desired excess pressure in the soft packing when pressure was applied in the vessel.

If mounted more or less vertically near the top of a closed vessel, the weight would oppose the extra forces on the packing developed by the pressure on the "unsupported area" and would tend to prevent the initial seal with no pressure in the vessel. However, above a certain critical pressure in the vessel, the net force of the shaft would be upwards against the packing. This net force could be made greater or the critical pressure necessarily lowered by increasing the size of the shaft passing through the packing gland, that is, at least for the length necessary to pass through the packing gland. In such cases, the weight of the shaft would best be balanced by spring tension sufficient to more than support the shaft with no pressure in the closed vessel. Decreasing the weight of the shaft assembly will correspondingly decrease the pressure or spring tension required. Thus, for example, a 3/4 of an inch shaft will have about 44 pounds thrust for each 100 pounds of pressure. By increasing the shaft diameter through the packing gland to 1 inch, the thrust in the packing gland will be increased to 79 pounds per 100 pounds of pressure with little added weight. Obviously a shaft mounted at some angle between the vertical and horizontal and requiring spring tension to produce the initial (low-pressure) seal will require less spring tension than if mounted truly vertical.

Equipment running continuously at high pressure will require no spring for the initial seal in the case of a more or less vertical shaft mounted at the top since the initial seal (before the packing had worn) for starting up could be made by using slightly oversize packing or by tightening the packing nut above the packing.

The packing gland of this invention is an improvement over all prior art packing gland devices, in that, as the fluid pressure increases, the tighter is the seal. Thus, such packings have been found satisfactory at pressures from zero to 2000 pounds per square inch (gauge) or higher when constructed of the proper materials. In prior art devices, on the other hand, increase of pressure generally caused a leaking of fluid pressure and a hazard in processing of volatile liquids due to leaking. Furthermore, as the packing gland material wears, repeated adjustments are unnecessary until the packing material is so badly worn that it will no longer make the initial seal at zero pressure. The packing gland of this invention, therefore, requires less attention than the conventional style packing around a rotating shaft. Furthermore, since the device operates upon the Bridgman principle of unsupported area, no leakage will occur under pressure. The packing gland of this invention is therefore suitable for use with steam turbines, centrifugal pumps, and reaction systems being agitated under reduced pressures. When the packing gland is used to seal shafts entering the equipment under vacuum, the shoulder on the shaft is placed outside the packing instead of inside, that is, the shoulder should be on the higher pressure side of the packing. In this case, a vertical shaft at the top of the vessel would be sealed, even without any vacuum on the vessel, while one at the bottom might require spring tension unless the vacuum were high. For use with either pressure or vacuum two sets of packing would be necessary, one outside and one inside the shoulder.

In order to minimize friction in the packing it will be desirable to grease the shaft in the bearing and packing periodically. This will in turn necessitate the use of oil resistant materials for the packing such as neoprene or other synthetic rubbers rather than natural rubber. The use of a grease fitting in the bronze bearings as shown in the figure should be adequate provided the packing is oil or grease coated when inserted.

What is claimed is:

1. In a wall subjected to different fluid pressure on opposite sides of the wall and having a passageway extending through the wall, a closure for the low pressure side of the passageway, a shaft assembly extending freely through the passageway and closure for rotation and comprising a shaft carrying an annular collar fixed thereto, a bearing freely encircling the shaft between the collar and closure and longitudinally slideable in the passageway, a sealing unit between the bearing and closure comprising an annular ring of soft material faced with a gasket encircling the shaft, and an annular thrust bearing encircling the shaft engaging the low pressure side of the collar and the adjoining bearing whereby longitudinal shift of the shaft assembly toward the side of low pressure compresses the sealing unit to expand the soft resilient material into fluid tight engagement with the shaft and wall of the passageway.

2. In a wall subjected to different fluid pressure on opposite sides of the wall and having a passageway extending through the wall, a closure for the low pressure side of the passageway, a shaft assembly extending freely through the passageway and closure for rotation and comprising a shaft carrying an annular collar fixed thereto, spaced annular bearings freely encircling the shaft between the collar and closure and longitudinally slideable in the passageway, a sealing unit between the bearings comprising an annular ring of soft resilient material faced with gaskets encircling the shaft, and an annular ball thrust bearing encircling the shaft engaging the low pressure side of the collar and the adjoining bearing whereby longitudinal shift of the shaft assembly toward the side of low pressure compresses the sealing unit to expand the soft resilient material into fluid tight engagement with the shaft and wall of the passageway.

3. In a wall subjected to different fluid pressure on opposite sides of the wall and having a passageway extending through the wall, the passageway having a shoulder facing the low pressure side of the wall, an adjustable closure for the low pressure side of the passageway, a shaft assembly extending freely through the passageway and closure for rotation and comprising a shaft carrying an annular collar fixed thereto, a bearing freely encircling the shaft between the collar and closure and longitudinally slideable in the passageway, a sealing unit between the bearing and closure comprising an annular ring of soft resilient material faced with gaskets encircling the shaft, an annular thrust bearing encircling the shaft engaging the low pressure side of the collar and the adjoining bearing whereby longitudinal shift of the shaft assembly toward the side of low pressure compresses the sealing unit to expand the soft resilient material into fluid tight engagement with the shaft and wall of the passageway, and an annular thrust bearing engaging the high pressure side of the collar and bearing against a spring carried by the shoulder whereby initial seal of the sealing unit is obtained.

FRANCIS R. RUSSELL.